United States Patent Office 2,934,086
Patented Apr. 26, 1960

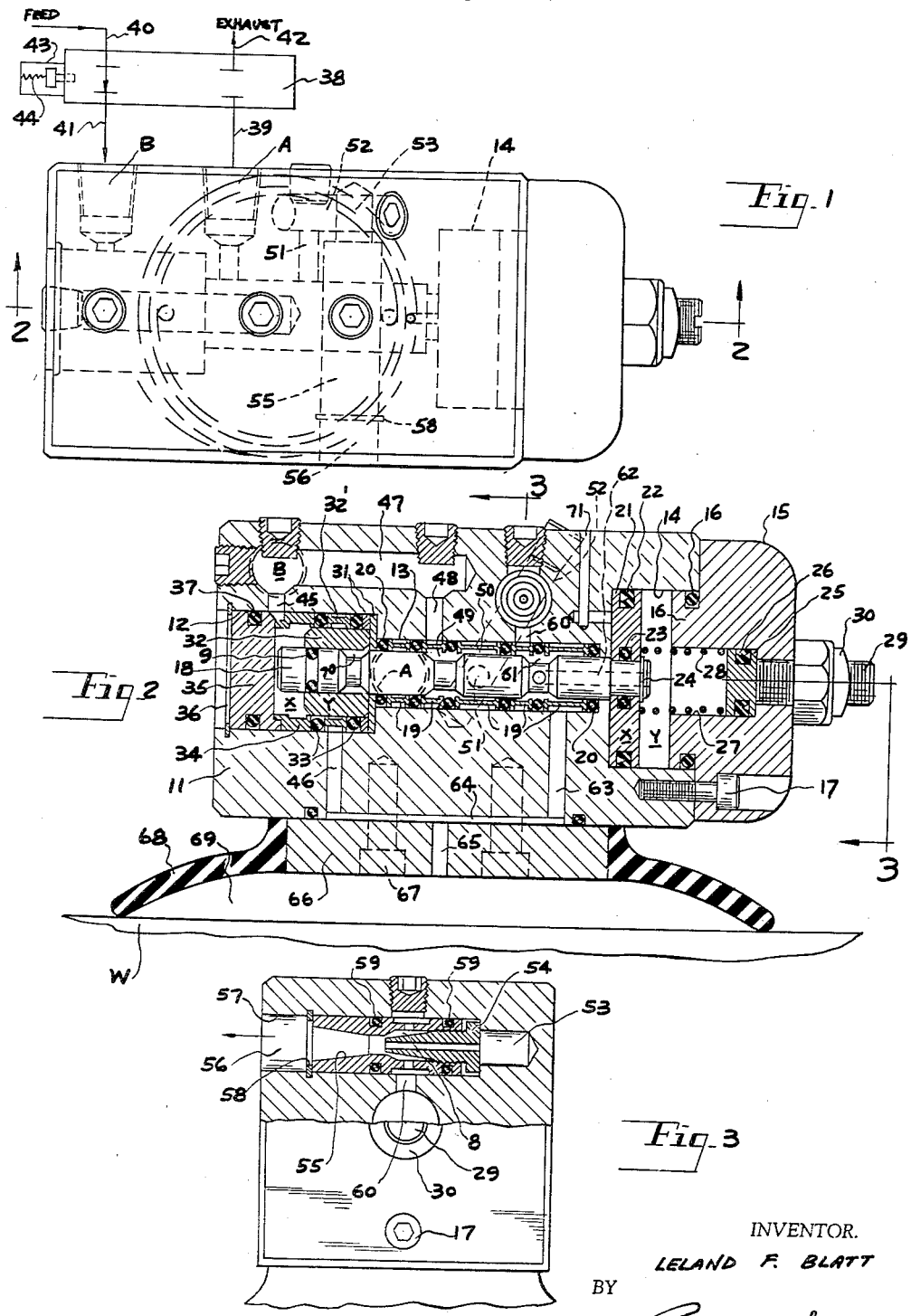

2,934,086

VACUUMATIC VALVE

Leland F. Blatt, Grosse Pointe Woods, Mich.

Application April 16, 1958, Serial No. 728,936

7 Claims. (Cl. 137—560)

This invention relates to a vacuumatic valve and more particularly to a valve operated by compressed air for producing and maintaining a predetermined vacuum.

It is the object of the present invention to provide in combination with a vacuum producing valve a four-way control valve adapted for delivering compressed air to one of a pair of ports of the vacuum producing valve and connecting the other port to exhaust, and upon adjustment of the four-way valve connecting said compressed air to the other of said ports at the same time connecting exhaust to the first mentioned port.

It is a further object of the present invention to provide a novel valve construction together with means for conducting a source of compressed air through a venturi assembly within the valve for creating an effective vacuum between 10 and 26 inches of mercury and utilizing said vacuum valve for doing work.

It is the object of the present invention to provide a vacuumatic valve assembly having a longitudinally reciprocal valve spool, a vacuum piston and an air piston, within associated bores within the valve body, together with suitable passages and related seals between said pistons and valve body and between said spool and valve body to provide an efficient readily responsive vacuum producing device.

It is a further object of the present invention to incorporate a vacuum piston associated with the valve spool for effecting sealing movements thereof for maintaining the initially created vacuum in a vacuum chamber and readily responsive to any falling off of vacuum to re-energize the vacuum source.

These and other objects will be seen from the following specification and claims in conjunction with the appended drawing in which:

Fig. 1 is a plan view of the present vacuum producing valve and associated four-way valve.

Fig. 2 is a section taken on line 2—2 of Fig. 1.

Fig. 3 is a fragmentary section taken on line 3—3 of Fig. 2.

It will be understood that the above drawing illustrates a preferred embodiment of the invention and that other embodiments are contemplated within the scope of the claims hereafter set forth.

Referring to the drawing, particularly Fig. 2, there is provided a metallic valve body 11, which has formed adjacent one end the axial bore 12 and connected therewith the intermediate axial bore 13 of reduced diameter. Bore 14 of greatest diameter is formed within the opposite end of the valve body and communicates with bore 13.

Cap 15 has an axial extension 16 on one side of reduced diameter snugly projected into bore 14 and secured to the body by one or more screws 17, there being a suitable O-ring seal 16' interposed.

An elongated valve spool 18 is longitudinally positioned through bore 13 with its opposite ends extending into bores 12—14, said spool having formed therein a series of annular grooves 49, 61 and 70.

A series of apertured annular retainers 19 are positioned within bore 13 for the purpose of spacing and locating a series of O-ring seals 20 within bore 13 and with respect to which spool 18 is longitudinally and co-operatively movable.

The vacuum piston 21 having the annular V-seal 22 nested therein is movably positioned within bore 14 and is mounted over the end of spool 18 against a shoulder thereon and retained thereon by locking ring 24, there being a suitable inner O-ring seal 23 interposed. Vacuum piston 21 is in the first control position X shown in Fig. 2, and in the manner hereafter described is movable to the second control position Y within bore 14.

Seal piston 25 with exterior annular V-seal 26 is positioned within the axial bore 27 of cap 15, and spring 28 extends into bore 27 and is interposed between vacuum piston 21 and seal piston 25, normally maintaining the vacuum piston in its first control position.

The tension of spring 28 upon the vacuum piston may be adjusted by threading stud 29 axially through the end of cap 15, there being a suitable lock nut 30 threaded onto stud 29 and engageable with said cap for securing adjusting stud 29 in position.

Within the inner end of bore 12 centrally receiving spool 18 is the spacer ring 31, there being an additional spacer ring 31 bearing against the first spacer ring having an aperture of increased diameter to receive the end of air piston 32, which is movably positioned upon spool 18 within bore 12.

The additional apertured retainer 34 is nested within said bore engageable with the outermost O-ring seal 33 and of sufficient internal diameter as to slidably receive air piston 32. In an adjacent groove within spool 18 there is provided an O-ring seal 9 cooperatively engaging the bore of air piston 32.

Second O-ring seal 33 in bore 12 is spaced inwardly of the first O-ring seal 33 with apertured retainer 32' interposed.

The outer end of bore 12 is closed by plug 35 which carries a suitable O-ring seal 37 cooperable with said bore, said plug being retained within said bore by lock-ring 36.

A conventional four-way valve 38 is shown in Fig. 1 with one of its outlets connected by pipe 39 to the air intake port A within valve body 11. Conduit 40 is adapted to supply compressed air to the four-way valve and depending upon the position of the conventional movable valve element therein is adapted to deliver compressed air to either of the two valve outlets. The second valve outlet is connected by conduit 41 to the air intake port B in the valve body.

The valve element within the four-way valve is so constructed that when the source of compressed air is connected with conduit 39 and port A, conduit 41 and port B will be connected with exhaust outlet 42. Conversely when air pressure conduit 40 is connected with conduit 41 and port B then conduit 39 and port A will connect with exhaust conduit 42.

Various means may be employed for controlling the position of the four-way valve element, and in the present preferred embodiment there is shown a solenoid 43 whose movable element when in-operative is spring biased at 44 to establish an in-operative condition of valve 38 so that compressed air is connected with conduit 39 and valve port A.

Energization of solenoid 43 withdraws its movable element against spring 44 reversing the connections so that compressed air is delivered through conduit 41 to port B.

In the inoperative condition of valve 38, air under pressure delivered to port A as shown in Fig. 2 is blocked by the cylindrical portion of spool 18, from entry into the right end of air chamber 12. Spool 18 carries vacuum piston 21 located in the X-control position shown.

*Operating sequence*

Upon energization of four-way valve control 43, port A will be open to exhaust through conduits 39 and 42, and compressed air is delivered through conduit 41 to port B. This air travels through passage 45, Fig. 2, through retainer 34 and into chamber X moving air piston 32 from vacuum release to the Y-position shown, sealing off vacuum passage 46. This is the vacuum sealing position.

Compressed air also travels through passages 47 and 48, around the seals 20 and into the groove 49 in spool 18 and communicates with chamber 50, passage 51, the upwardly extending passage 52 and intake passage 53 for delivery to the exhaust passage 56 containing the venturi shown in Fig. 3, with associated low pressure chamber 8.

In Fig. 3, there is provided adjacent intake passage 53 the transverse bore 57 which receives and retains venturi housing 55 of conventional construction sealed therein at 59 and secured by locking ring 58.

Said venturi housing carries the adjustable nozzle 54 with axial passage for delivering compressed air from chamber 53 through the reduced portion of the venturi and the outwardly tapered portion into the outlet 56 for exhausting to the atmosphere.

In a conventional manner this produces a low pressure or vacuum condition within annular chamber 8 which communicates with passage 60 also shown in Fig. 2. This passage communicates with groove 61 in the valve spool for establishing vacuum communication to passages 62—63.

The passage 62 in spool 18 communicates with bore 14, and vacuum passage 63 through undercut slot 64 joins vacuum passage 46 in the valve body. Vacuum passages 63 and 46 join radial passage 65 in mounting disc 66 secured to the valve body by screws 67.

A vacuum cup 68, preferably constructed of neoprene or rubber, or other flexible material, is suitably secured axially around disc 66 defining the vacuum chamber 69. Said vacuum cup may be employed for vacuum lifting of some object such as designated by the letter W, with passages 63 and 46 connected together in communication with the defined vacuum operating chamber 69.

During the operation of the device, with compressed air being delivered to the venturi 55, Fig. 3, vacuum pressure increases in bore 14 and in vacuum operating chamber 69 to a predetermined or pre-set value of from 10 inches of mercury up to 26 inches. This value is governed by the adjustable spring load 28 in turn controlled by the adjusting of sealing piston 25 within bore 27, by means of stud 29.

At this time the chamber 69 within the vacuum cup as well as the chamber 14 is being evacuated. At the point where the vacuum pressure overcomes the spring load 28 and with the benefit of atmospheric air through passage 71 in the valve body, the vacuum piston 21 moves to Y control position effecting a corresponding movement of spool 18.

Groove 61 in said spool is so arranged with respect to passages 60 and 63 that when the spool is moved to the right, the passages 62 and 63 are sealed off from the vacuum conducting passage 60 before the venturi vacuum producing air from port B and passages 47 and 48 are sealed off from passage 51. This establishes an effective vacuum seal as to passages 62 and 63 before the vacuum producing compressed air moving into groove 49 is cut off by the second Y control position of spool 18 which closes off air passage 48.

Consequently, if there was any interruption of the compressed air supply or interruption from the four-way valve to ports A and B in the valve body, this would not in any manner disrupt the vacuum seal within vacuum operating chamber 69 and in chamber 14. Any wear, or minor damage to any of the valve seals or to the vacuum cup 68 which causes a lowering of the pre-set maintained vacuum pressure would have the effect of re-setting vacuum piston 21 to the X-control position under the action of spring 28. This would cause a corresponding movement to the left of spool 18 to the vacuum producing position and would be indicative that a repair was necessary. Return of spool 18 to its initial control position as in Fig. 2 re-establishes air to the venturi and vacuum to chamber 14. Anytime the vacuum within chamber 14 or the interior of the bore 27 falls off, naturally the spring takes over returning the vacuum piston 21 to its initial position shown in Fig. 2.

Just as soon as vacuum builds up again within passage 62 which communicates with groove 61 within the spool and with bore 14 or vacuum chamber then the said vacuum acts against spring 28 and the vacuum piston 21 and associated spool 18 returns to the Y position. Accordingly once the desired vacuum condition has been created within chamber 69 further flow of compressed air to the venturi system is shut off and need not be run constantly.

By deenergization of the four-way valve 38 permitting its valve element to return to its neutral position under the action of spring 44, port B in the valve body will then be open to exhaust. Port A will then be supplied with air under pressure from conduit 39 and this air as indicated in Fig. 2 is directed to the undercut groove 70 within the valve spool which had theretofore been held in the Y position by vacuum.

The right end of air piston 32 has an internal taper so that application of compressed air into groove 70 from port A will force air piston 32 to the left into the X or vacuum release position opening vacuum passage 46 to air pressure through apertured retainer 32'. This delivery of air pressure neutralizes the vacuum in vacuum operating chamber 69 and quickly releases the part W. At the same time, the vacuum piston 21 and connected spool 18 move to the X position under the action of the spring 28 and under shock air pressure with the result that further air flow through port A is blocked off by the cylindrical portion of spool 18 adjacent groove 70. Thus there is provided a vacuumatic valve operated by compressed air which when associated with the vacuum cup 68 may be employed for the vacuum lifting of articles W.

In the control of the four-way valve 38, the air delivery may be reversed to port A of the valve body and the vacuum immediately disengaged, permitting the release of the workpiece.

The present vacuumatic valve may be used to evacuate and maintain a vacuum storage tank taking the place of the chamber 69 and the cup 68.

The connection from the tank would be made to passage 63 only. As vacuum pressure is utilized from the said tank and the vacuum reaches a condition below the vacuumatic valve's preset value the vacuum re-energizes as above described and brings the vacuum up to the pre-set value before shutting off the vacuum producing media.

Having described my invention, reference should now be had to the following claims.

I claim:

1. A vacuumatic valve comprising an elongated body having an axial bore terminating in closed air and vacuum chambers at its opposite ends, a valve spool slidably positioned through said bore and extending into said chambers, a vacuum piston secured on one end of said spool movable within said vacuum chamber, spring means interposed between the body and one side of said piston normally retaining said piston and spool in a first control position, there being an air vent passage in the body communicating with said vacuum chamber on the opposing side of said piston, a reciprocal air piston within said air chamber slidably movable over said spool from vacuum release to vacuum sealing position, there being a pair of connected vacuum passages in said body joined at their one ends respectively to said chambers, and at their other ends communicating with a vacuum operating chamber, an intake port in the body joined to said air chamber and adapted for connection with a source of compressed air, there being an air exhaust passage in said body communicating with the atmosphere, a venturi in said exhaust passage including a low pressure chamber communicating with said vacuum chamber and vacuum passages, there being an air passage in said body interconnecting said intake port with said venturi, said spool having an annular groove so positioned as to maintain air communication through said air passage to said venturi in one position of said spool, and displaceably interrupting said communication on movement of the spool to a second position, air supplied to said air chamber at its one end moving said air piston to vacuum sealing position relative to one of said vacuum passages, said vacuum passages being closed off from said air chamber and compressed air supply by said air piston and valve spool respectively, a second intake port in the body adapted for alternate connection with said source of compressed air, said spool having a second annular groove so positioned as to communicate with said air chamber at its other end and in registry with said second intake port when said spool is in its second control position, said compressed air in said second intake port and second groove acting on and moving said air piston to vacuum release position uncovering one of said vacuum passages establishing communication between said air chamber and said one of said vacuum passages, releasing vacuum in said operating chamber and in said vacuum chamber, causing return movement of said spool to its first control position.

2. The vacuumatic valve of claim 1, build up of vacuum in said vacuum chamber and communicating vacuum passages causing movement of said vacuum piston and spool to a second control position against the action of said spring means, there being a third annular groove in said spool maintaining vacuum communication between said low pressure chamber and said vacuum chamber and vacuum passages in one control position of said valve spool, movement of said spool to a second control position first sealing off said vacuum chamber and vacuum passages from the venturi low pressure chamber, said first annular groove successively blocking the flow of compressed air to said venturi.

3. The vacuumatic valve of claim 1, build up of vacuum in said vacuum chamber and communicating vacuum passages causing movement of said vacuum piston and spool to a second control position against the action of said spring means, there being a third annular groove in said spool maintaining vacuum communication between said low pressure chamber and said vacuum chamber and vacuum passages in one control position of said valve spool, movement of said spool to a second control position first sealing off said vacuum chamber and vacuum passages from the venturi low pressure chamber, said first annular groove successively blocking the flow of compressed air to venturi, any falling off of vacuum in said vacuum chamber below a predetermined point, permitting said spring means to return said vacuum piston and spool to their first control positions, re-establishing air pressure to said venturi and communication between said low pressure venturi chamber and said vacuum chamber.

4. A vacuumatic valve comprising a body having an axial bore with closed air and vacuum chambers respectively at opposite ends thereof, a valve spool slidably positioned in said bore and extending into said chambers, a vacuum piston secured on one end of said spool movable within said vacuum chamber, a spring interposed between the body and one side of said piston normally retaining said piston and spool in a first control position, there being an air vent passage in the body communicating with said vacuum chamber on the opposite side of said piston, a reciprocal air piston within said air chamber slidably movable over said spool from vacuum release to vacuum sealing position, there being a pair of interconnected vacuum passages in said body joined at their one ends respectively to said chambers and at their other ends communicating with a vacuum operating chamber, there being an exhaust outlet passage in said body, a venturi in said passage including a low pressure chamber connected with said vacuum chamber, a compressed air intake port joined to said air chamber on one side of said air piston and also joined to said exhaust passage, said spool controlling flow of air to said venturi and communication of its low pressure chamber with said vacuum chamber, air delivered to said air chamber moving the air piston from vacuum release to vacuum sealing position relative to one of said vacuum passages, said vacuum passages being closed off from said air chamber and compressed air supply by said air piston and valve spool respectively, and a second compressed air port adapted for connection to said air chamber on the opposite side of said air piston for acting on and moving said air piston to vacuum release position, uncovering one of said vacuum passages establishing communication between said air chamber and said one of said vacuum passages, releasing vacuum in said operating chamber and in said vacuum chamber, causing return movement of said spool to its first control position, there being a series of longitudinally spaced annular grooves in said valve spool, said grooves being so arranged and spaced in one control position of said spool establishing communication of compressed air to said venturi, communication of said low pressure chamber with said vacuum chamber, and blocking off compressed air from said second compressed air port to one end of said air chamber, said grooves on movement of said spool to a second control position, successively closing off vacuum communication between said low pressure chamber and vacuum chamber, said air pressure to said venturi, and establishing air pressure communication to said air chamber on the other side of said air piston.

5. The vacuumatic valve of claim 4, and adjustable screw means on the valve body for the regulating of tension in said spring for setting the amount of vacuum build up in said vacuum chamber required to cause movement of said spool and said vacuum piston from one control position to a second control position.

6. The vacuumatic valve of claim 4, a cap over the end of said body closing said vacuum chamber, an axial bore in said cap receiving one end of said spring, a seal piston in said bore bearing against said spring, and a stud adjustably threaded through the end of said cap for setting the position of said seal piston and consequently the tension in said spring.

7. In a vacuumatic valve, a valve body including a bore and at its opposite ends air and vacuum chambers respectively, a movable valve spool in said bore extending into said chambers, a vacuum piston in said vacuum chamber secured to said spool, there being an air vent passage in the body communicating with said vacuum chamber on one side of said vacuum piston, an exhaust passage in said body, a venturi in said passage and including a low pressure chamber adapted for connection with said vacuum chamber, there being a pair of interconnected vacuum passages joined at their one ends respectively to said air and vacuum chambers, the other ends of said vacuum passages adapted for connection to a vacuum operating chamber, spring means normally retaining the vacuum piston and spool in one control position and against movement to a second control position, a movable air piston in said air chamber, a pair of air ports in said body adapted for alternate communication with a source of compressed air, there being passages in said valve body connecting one air port with one end of said air chamber on one side of the piston therein adapted for moving said piston from vacuum release position to vacuum sealing position and also for connecting said one air port with said venturi, and for connecting said low pressure venturi chamber and said vacuum chamber, said vacuum passages being closed off from said air chamber and compressed air supply by said air piston and valve spool respectively, there being an additional passage joined to the other air port normally blocked off by said valve spool when in its first control position, there being an annular groove in said spool so positioned as to be normally displaced from said additional passage with said valve spool in a first control position, and on movement of said valve spool to a second control position establishing communication between said additional passage and air chamber on the other side of said air piston, for the purpose of acting on and moving said air piston from vacuum sealing to vacuum release position, uncovering one of said vacuum passages establishing communication between said air chamber and said one of said vacuum passages, releasing vacuum in said operating chamber and in said vacuum chamber, causing return movement of said spool to its first control position, there being a pair of spaced additional annular grooves in said spool so positioned thereon for respectively establishing in one control position of said spool flow of compressed air to said venturi and communication between the venturi low pressure chamber and vacuum chamber.

References Cited in the file of this patent

UNITED STATES PATENTS

| | | |
|---|---|---|
| 2,280,658 | Miller | Apr. 21, 1942 |
| 2,803,110 | Chittenden | Aug. 20, 1957 |